United States Patent [19]

Hoff

[11] 4,152,881
[45] May 8, 1979

[54] LAWN MOWER BLADE ROTATION WARNING DEVICE

[75] Inventor: Stephen J. Hoff, Richmond, Ind.

[73] Assignee: Hoffco, Inc., Richmond, Ind.

[21] Appl. No.: 794,010

[22] Filed: May 5, 1977

[51] Int. Cl.² .................... A01D 69/00; A01D 69/08; A01D 69/10

[52] U.S. Cl. .................................. 56/11.3; 192/30 W

[58] Field of Search ..................... 56/11.3; 192/30 W; 116/115

[56] References Cited

U.S. PATENT DOCUMENTS

| | | | |
|---|---|---|---|
| 2,753,029 | 7/1956 | Babian | 192/30 W |
| 2,825,776 | 3/1958 | Curtis | 192/30 W |
| 2,985,992 | 5/1961 | Dowdle | 56/11.3 |
| 3,253,391 | 5/1966 | Meldahl | 56/11.3 |
| 3,756,042 | 9/1973 | Heth et al. | 192/30 W |
| 3,786,776 | 1/1974 | Buthe | 192/30 W |
| 4,035,994 | 7/1977 | Hoff | 56/11.5 |
| 4,044,533 | 8/1977 | Wick | 56/11.3 |

Primary Examiner—Russell R. Kinsey
Assistant Examiner—Paul J. Hirsch
Attorney, Agent, or Firm—Jenkins, Coffey & Hyland

[57] ABSTRACT

A warning device for a lawn mower having a rotary blade driven from a motor through a centrifugal clutch and normally held stopped by a brake which is released by a deadman control. A clicker arm is pivoted to the clutch driver and spring-pressed toward engagement with the driven clutch drum so as to repeatedly strike a notch therein and sound a warning in the event the motor stops and thereby stops the driving clutch element while the brake is disengaged and allows the blade to spin from its own momentum. A centrifugal weight connected to the clicker arm retracts it when the clutch drive is operating normally.

9 Claims, 4 Drawing Figures

LAWN MOWER BLADE ROTATION WARNING DEVICE

BACKGROUND OF THE INVENTION

It has been proposed, as in my U.S. Pat. No. 3,026,665 and in my co-pending application Ser. No. 581,029, filed May 27, 1975, now U.S. Pat. No. 4,035,994 to connect a rotary lawn mower blade to its driving engine through a centrifugal clutch having centrifugal shoes on the clutch driver which are normally retracted at engine idling speeds and which at engine operating speeds are centrifugally engaged with a driven clutch drum fixed to the rotary cutting blade. A blade brake, such as a band engaging the external surface of the clutch drum, normally holds the blade stopped under engine idling conditions. When the operator actuates a deadman control, this concurrently releases the brake and opens the engine throttle. The resulting higher engine speed actuates the centrifugal clutch so as to drive the drum and the blade. The primary purpose of this blade control arrangement is safety, so that the blade will not be driven except when the operator of the lawn mower is in a proper operating position and appropriately holds the deadman control handle in actuated position.

I find that an usafe condition can occur with this arrangement when the engine stops, as from running out of fuel or because of some other failure, while the deadman control is held in its actuated position. Under these conditions, the engine stops and the centrifugal clutch disengages, but since the brake is held disengaged by the actuated deadman lever, the blade and the driven clutch drum are free to rotate from the momentum of the blade. Such rotation makes no noise, and since the engine is stopped and silent, the operator may assume that the blade is stopped when in fact it may be rotating at considerable speed and with considerable momentum.

The present invention provides a warning device which operates under these conditions, namely, when the engine is stopped and the clutch disengaged but the brake is also disengaged so that the blade and driven clutch drum are free to rotate from their own momentum.

SUMMARY OF THE INVENTION

In accordance with the invention, a warning device is combined with the clutch and is made operative to generate a warning signal in response to rotation of the blade relative to the stopped clutch driver, and means is provided to inactivate the warning device when the clutch is engaged. In a preferred embodiment, a warning device, such as a clicker arm, is mounted for rotation with the clutch driving element and biased to an operative position in which it will generate a warning signal if the clutch driving element is stopped and the clutch driven element overruns the clutch driving element. A centrifugal element connected with the warning device is operative to inactivate the warning device when the clutch driving element is rotating either at idle or at blade-driving speed. Desirably, the warning device comprises a pivoted clicker arm carried with the clutch driver and biased toward engagement with the driven clutch drum so as to repeatedly strike a surface interruption thereon and sound a warning when the clutch overruns the stopped driving element. A counterweight arm connected to the clicker arm operates to retract the clicker arm when the clutch driver rotates above a predetermined low speed.

BRIEF DESCRIPTION OF THE DRAWINGS

The accompanying drawings illustrate the invention, and show a preferred embodiment exemplifying the best mode of carrying out the invention as presently contemplated. In such drawings.

DETAILED DESCRIPTION OF THE SPECIFIC EMBODIMENT

Figure 1:
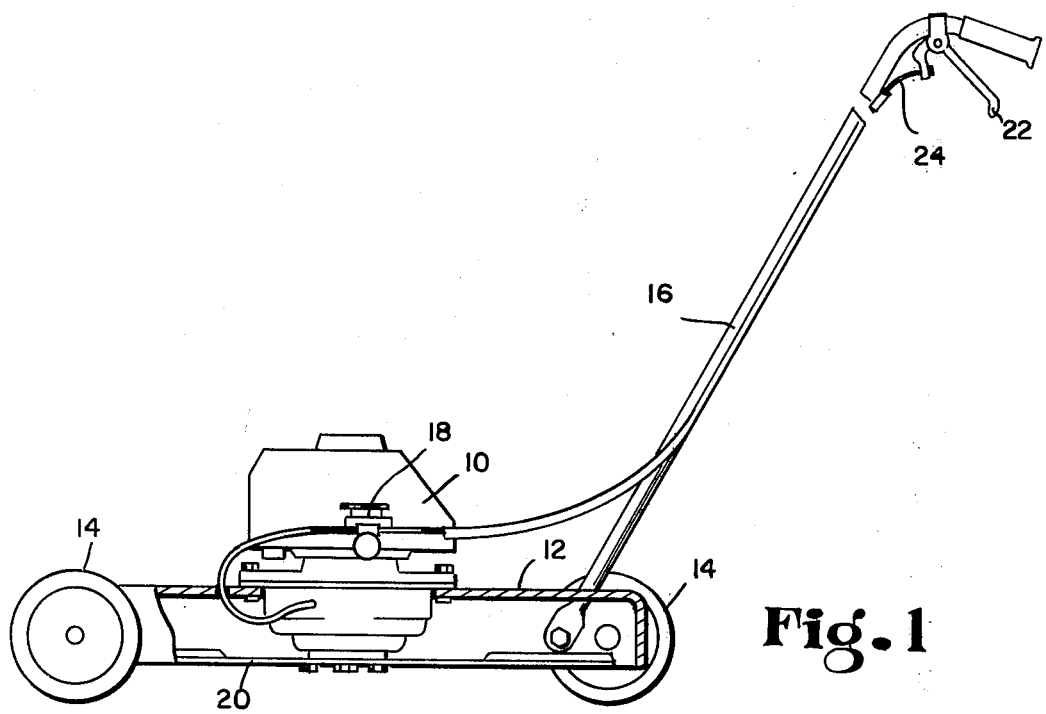
FIG. 1 is a side elevation of a rotary blade lawn mower to which the invention is applicable.

The lawn mower shown in FIG. 1 comprises an engine 10 mounted on a deck 12 supported by wheels 14 and provided with a handle 16 by which the mower is manually propelled and controlled. The engine has a carburetor 18 controlled by a throttle and is connected to drive a rotary motor blade 20 through the mechanism described below. A deadman control lever 22 is mounted on the handle 16 in a position to be moved to an actuated position adjacent the hand grip of the handle and held therein during normal operation of the mower. The deadman lever 22 is connected by a control cable 24 both to the throttle of the carburetor 18 and to a blade brake described below.

Figure 2:
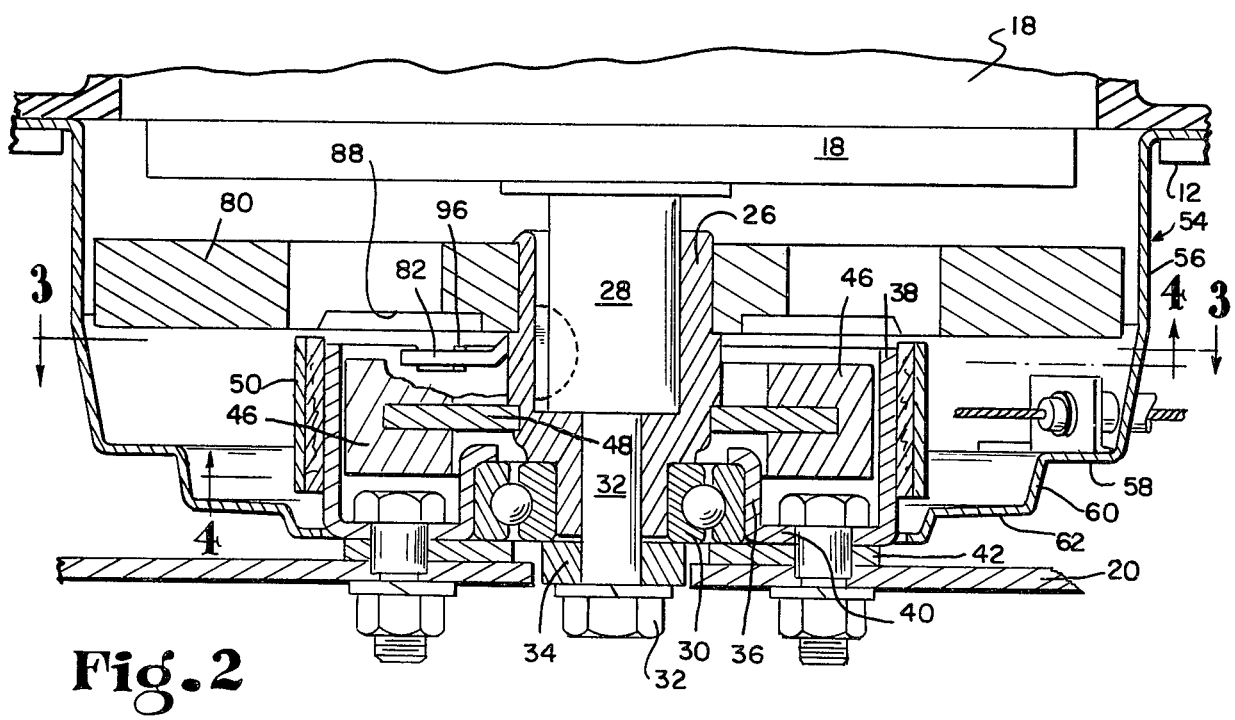
FIG. 2 is an axial section of the blade driving mechanism.

As shown in FIG. 2, the blade drive mechanism comprises a hub 26 mounted on and keyed to the shaft 28 of the engine 18. A reduced diameter portion at the lower end of the hub 26 carries the inner race of a ball bearing 30, and this is held in place and the hub 26 held on the shaft 28 by a bolt 32 which clamps a heavy washer 34 against the race and is threaded into the end of the shaft 28. The outer race of the ball bearing is received within and carries an inner cylindrical mounting flange 36 for a clutch drum 38. The mounting ring and drum are integrally connected by a web 40. An annular mounting plate 42 is fixed against the lower face of the web 40, and the blade 20 is bolted against the lower face of such mounting plate 42. By this arrangement, the blade 20 is supported by the ball bearing 30 for free rotation on the axis of the hub 26. A pair of clutch shoes 46 are mounted on a shoe carrier 48 fixed on the hub 26 intermediate the height of the drum 38. The shoes are interconnected by a pair of springs 48 which normally hold them in retracted position, disengaged from the driven drum 38.

Figure 3:
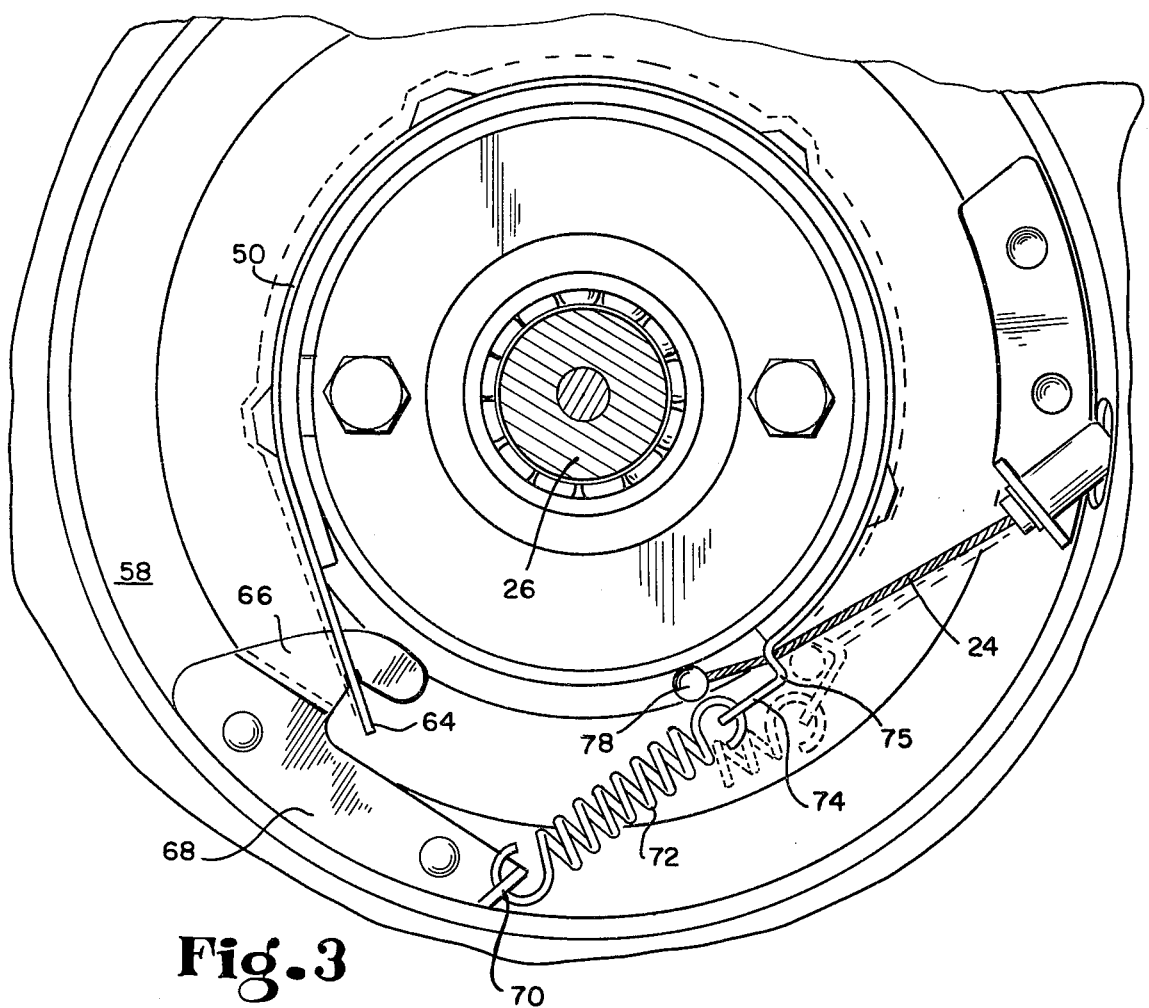
FIG. 3 is a section taken on line 3—3 of FIG. 2, looking downward and with the clutch shoes and shoe carrier omitted.

A blade brake in the form of a brake band 50 lined with frictional braking material 52 is mounted for engagement with the exterior face of the drum 38. As shown in FIGS. 2 and 3, the blade driving mechanism is surrounded by a bowl 54 mounted by its upper flange between the engine 18 and the deck 12 of the mower. Such bowl 54 has a generally cylindrical upper and outer portion 56 which extends downward to and joins an annular flat portion 58 which is connected by an offset 60 to a lower inner ring 62 that extends inward into close proximity with the lower edge of the drum 38. The brake actuating mechanism is desirably mounted on the annular flange 58 of the bowl and may be as shown in FIG. 3. The fixed end 64 of the brake band 50 is slotted and engaged over a hook 66 forming part of a bracket 68 mounted on the bowl flange 58. The opposite end of the bracket 68 is turned upward to form a spring anchor 70, and a brake-actuating spring 72 is connected between that anchor and the free end 74 of the brake band. Such free end 74 of the brake band is offset to form a seat 75 and is provided with an elongated slot 76, the forward end of which receives the end of the spring 72. The lower end of the control cable 24 extends through such slot 76 and carries a stop lug 78 at its end adapted to engage in the seat 75. The cable is biased to brake-engaging position as shown in full lines in the drawings, by spring means (not shown) independent of the brake-actuating spring 72. The control cable 24 desirably has some lost motion with respect to the free end 74 of the brake band 50, and as shown in FIG. 3, the stop lug 78 is projected beyond the seat 75 when the control cable 24 is in released or brake-engaging position as shown in full lines in FIG. 3. The spring 72 is then free to pull the free end of the brake band to engaged position. When the control cable is pulled by the dead man lever 22 to an operating position, the stop lug 78 on the end of that cable moves through its lost motion so as to engage the seat 75, and then pulls the free end of the brake band against the action of the spring 72 to a brake-disengaged position shown in dotted lines in FIG. 3.

Desirably, and as shown, a flywheel 80 is mounted on the clutch driver hub 26 immediately above the centrifugal clutch mechanism, and such flywheel 80 forms a convenient mounting plate for the warning signal device of the present invention. A mounting plate fixed to the hub 26 may be used to mount the signal device if a flywheel is not present.

Figure 4:
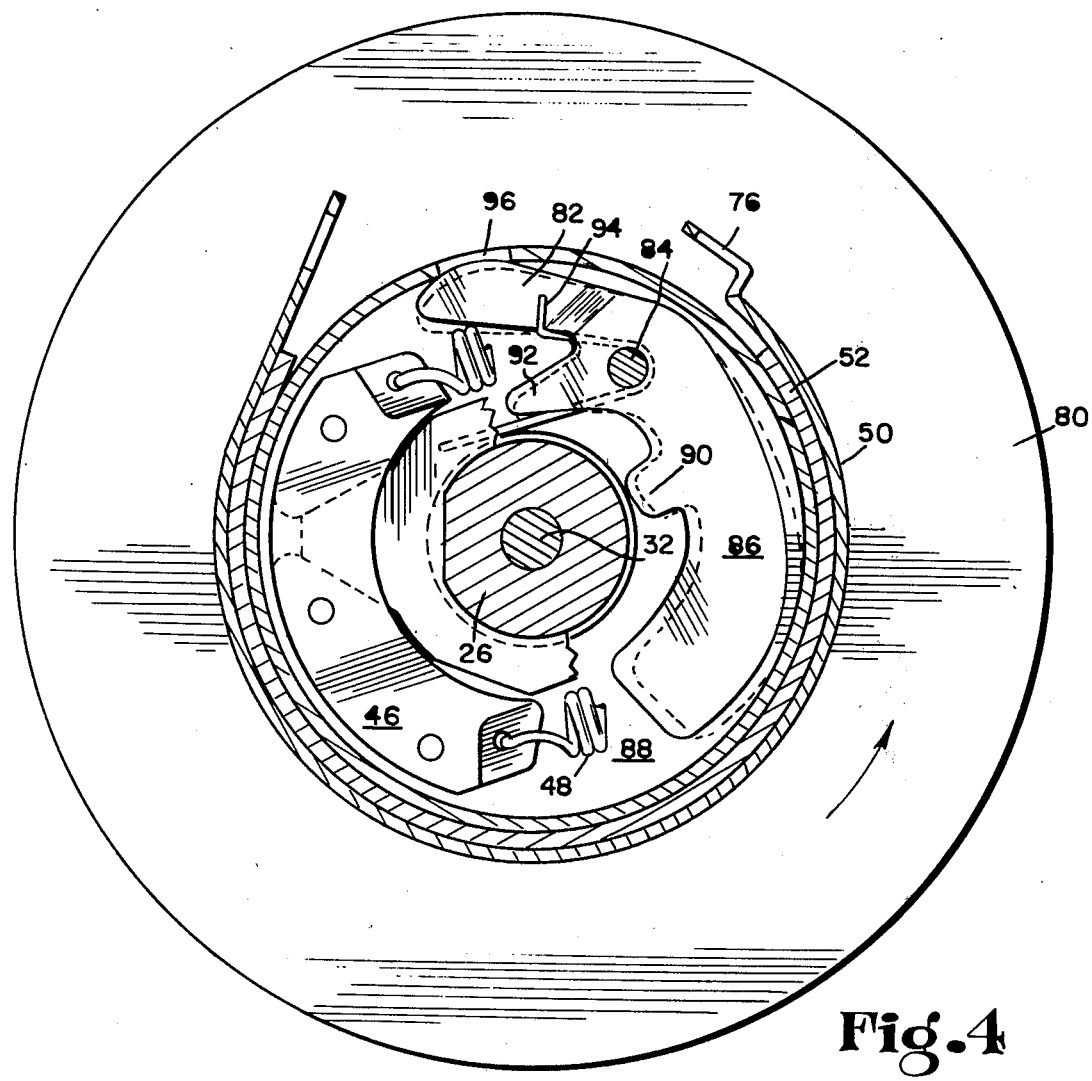
FIG. 4 is a section taken on the line 4—4 of FIG. 2, looking upward toward the bottom face of the flywheel and showing a clicker arm mounted thereon.

The signal device shown comprises a clicker arm 82 pivotally mounted on a post 84 carried by the flywheel 80. The clicker arm 82 is connected to a weight arm 86 extending in the opposite direction from the post 84 and forming a centrifugal weight of sufficient mass to retract the clicker arm 82 under normal operating conditions. Conveniently, a shallow annular recess 88 is formed in the bottom face of the flywheel 80, and the post 84 is provided by a rivet fixed to the flywheel within such recess. The main body of the signal lever formed by the clicker arm 82 and weight arm 86 lies between the bottom of that recess 88 and the top edge of the clutch drum 38 but the end of the clicker arm 82 is offset downward from the plane of the weight arm 86 to a level slightly below the top edge of the driven clutch drum 38 so that it will engage the inner surface of that drum. Such inner surface is notched as at 96 to form a surface interruption or striker which will generate an audible signal when struck by the clicker arm. To limit the swinging movement of the signal lever, such lever is formed with a stop boss 90 on the weight arm 86 and with a stop nose 92 adjacent the clicker arm 82, which stop elements respectively have stop positions against the hub 26 when the lever rotates in opposite directions. The signal lever 82–86 is biased in a clockwise direction as shown in FIG. 4, by a hairpin spring 94 bent about the pin 84 and having its outer end hooked over the clicker arm 82 and its inner end bearing against the hub 26.

Operation is as follows: When the mower is at rest with the engine off, the dead man lever 22 is in its inactive position as shown in full lines in FIG. 1, the throttle of the carburetor 18 is in idle position, and the brake 50 is engaged with the drum 38 as shown in full lines in FIG. 3. The centrifugal clutch shoes 46 are then retracted so that the engine shaft is disconnected from the driven drum 38 of the clutch and hence from the blade 20, but the blade is held stopped. The engine can then be started, and will run at idle speed without actuating the clutch shoes to engage drum 38. To operate the mower, the operator raises the deadman lever 22 to actuated position. This pulls the control cable 24 so as to open the throttle of the carburetor 18 and to disengage the brake 50 from the drum 38. As the engine accelerates, the shoes 46 are moved outward under centrifugal force to engage the drum 38 and drive that drum and the connected blade 44. If the operator releases the deadman lever, the control cable moves under its spring bias to move the carburetor throttle to idle position and release the brake band so as to permit the spring 72 to apply the brake 50. As the engine slows to idle speed, the centrifugal clutch shoes 46 are retracted so that the engine runs freely without driving engagement of the shoes with the clutch drum 38, and such drum is held stopped by the brake band 50. During these operations, the warning signal lever 82–86 is ineffective to create any warning signal, except perhaps momentarily as the engine is cranked for starting. At idling speed of the engine, the mass of the weight arm 86 of such signal lever is sufficient to overcome the force of the biasing spring 94, so that centrifugal force causes it to move the clicker arm 82 to a retracted position where it does not strike the notch 96 of the drum 38 even though that drum is at rest while the driving elements of the clutch are rotating. At operating speeds, the clicker arm 82 is likewise held retracted, and moreover, there is no relative rotation between the clicker arm 82 carried with the clutch driver and the drum 38 forming the driven element of the clutch.

However, in the event the engine runs out of fuel or otherwise fails so that its shaft 28 stops while the deadman lever 22 is held in actuated position, the centrifugal clutch shoes 46 will be retracted by their biasing springs 48 and disengaged from the drum 38. But the brake 50 will also be held disengaged by the position of the deadman lever 22, with the result that the clutch drum 38 and the blade 44 will be free to rotate under their own momentum. Such free rotation may be at high speed, with considerable energy, and may continue for a considerable length of time. Under these conditions, with the driving parts of the clutch at rest there will be no centrifugal force to actuate the weight arm 86 of the signal lever 82–86, and he clicker arm 82 will be moved by its biasing spring 94 to its operative position as shown in full lines in FIG. 4, where its end will ride against the inner surface of the drum 38 and will strike the surface interruption formed by the notch 96 on each rotation of that drum 38. This will result in a distinctly audible clicking sound synchronized with the rotation of the blade 44, to serve as a warning to the operator that the blade 44 is still rotating.

I claim:

1. In a lawn mower having a rotary blade which is normally either driven by a motor through a releasable clutch having a driver connected to the motor or braked by a releasable brake, means for generating a warning signal in the event the clutch and brake are both sufficiently disengaged to permit the blade to rotate under its own momentum, said means comprising a signal generating device operative in response to overrunning rotation of the blade relative to the clutch driver for generating a warning signal, and means operable during overrunning rotation of the clutch driver relative to the blade for inactivating said signal generating device.

2. Apparatus as in claim 1 in which said signal generating means is a movable clicker mounted for rotation with the clutch driver and biased to an operative position in the path of a striker carried with the driven blade, and in which said inactivating means comprises a centrifugal means to move said clicker to an inoperative position when said clutch driver is rotated at a predetermined speed.

3. Apparatus as in claim 1 in which said clutch is a centrifugal clutch having normally retracted shoes on the clutch driver, and said inactivating means comprises a centrifugal element responsive to rotation of the clutch driver.

4. Apparatus as in claim 1 in which said clutch is a normally disengaged centrifugal clutch and said signal generating device is a clicker mounted for rotation with the clutch driver and movable between an operative position and a retracted position, means biasing the clicker to operating position, and in which said inactivating means is a centrifugal element operative to move the clicker to its retracted position in response to rotation with the clutch driver, and a striker carried with the driven blade in position to strike the clicker in its operative position when the blade overruns the clutch driver.

5. In a lawn mower having a rotary blade which is normally either driven by a motor through a releasable clutch having a driver connected to the motor or braked by a releasable brake, means for generating a warning signal in the event the clutch and brake are both sufficiently disengaged to permit the blade to rotate under its own momentum, said means comprising a signal generating device operative in response to rotation of the blade relative to the clutch driver for generating a warning signal, and means for inactivating said signal generating device, wherein said clutch is a normally disengaged centrifugal clutch and said signal generating device is a clicker mounted for rotation with the clutch driver and movable between an operative position and a retracted position, means biasing the clicker to operating position, wherein said inactivating means comprises a centrifugal element operative to move the clicker to its retracted position in response to rotation with the clutch driver, and a striker carried with the driven blade in position to strike the clicker in its operative position when the blade overruns the clutch driver, and wherein the clicker is an arm mounted on a pivot carried with the clutch driver and offset from its axis, and said centrifugal element is an oppositely extending weight arm more responsive to centrifugal force than said clicker arm, and means biasing said clicker arm to an operative position in the path of a striker carried with the blade, the force of said biasing means being overcome by centrifugal force on said weight arm when the clutch driver is rotated at a predetermined speed.

6. In a lawn mower having a rotary blade mounted for rotation on the axis of a power shaft, a centrifugal clutch having a driver connected to the power shaft and a drum connected to the blade, a blade brake, and control means such that the brake is normally engaged to stop the blade when the power shaft is stopped and the centrifugal clutch disengaged, the improvement comprising a signal generating device for generating a warning signal when both the clutch and brake are sufficiently disengaged to permit the blade to rotate under its own momentum, said device comprising a clicker mounted for rotation with the clutch driver and movable between operative and inoperative positions, a striker carried with the blade in position to strike the clicker in its operative position when the blade overruns the clutch driver, means for normally maintaining said clicker in its operative position and centrifugal means for moving the clicker to inoperative position in response to normal rotation of the clutch driver.

7. Apparatus as in claim 6 in which said clicker comprises a striking portion movable against a portion of the clutch drum, and said striker is formed by a surface interruption in the portion of the drum engaged by the clicker.

8. In a lawn mower having a rotary blade mounted for rotation on the axis of a power shaft, a centrifugal clutch having a driver connected to the power shaft and a drum connected to the blade, a blade brake, and control means such that the brake is normally engaged to stop the blade when the power shaft is stopped and the centrifugal clutch disengaged, the improvement comprising a signal generating device for generating a warning signal when both the clutch and brake are disengaged and the blade is rotating under its own momentum, said device comprising a lever pivoted on a pivot carried eccentrically with the clutch driver and having a clicker arm and an oppositely extending weight arm, said clicker arm being movable against a surface of the driven clutch drum and being biased in the direction of such movement, said drum having a surface interruption in the path of engagement by said clicker arm so as to generate an audible signal as the clicker rides across such interruption, and said weight arm being operable to move said clicker arm to an inoperative position in response to centrifugal force during normal powered rotation of said clutch driver.

9. In a lawn mower having a rotary blade mounted for rotation on the axis of a power shaft, a centrifugal clutch having a driver connected to the power shaft and a driven element connected to the blade, a blade brake, and control means such that the brake is normally engaged to stop the blade when the power shaft is stopped, the improvement comprising a signal generating device for generating a warning signal when both the clutch and brake are sufficiently disengaged to permit the blade to rotate under its own momentum, said device comprising a lever pivoted on a pivot carried eccentrically with the clutch driver and having a clicker arm and an oppositely extending weight arm, said clicker arm being movable against a surface movable with the driven clutch element and being biased in the direction of such movement, said surface having an interruption in the path of engagement by said clicker arm so as to generate an audible signal as the clicker rides across such interruption, and said weight arm being operable to move said clicker arm to an inoperative position in response to centrifugal force during normal powered rotation of said clutch driver.

* * * * *